United States Patent
Olson et al.

(10) Patent No.: US 8,652,235 B2
(45) Date of Patent: Feb. 18, 2014

(54) SORBENTS FOR THE OXIDATION AND REMOVAL OF MERCURY

(75) Inventors: Edwin S. Olson, Grand Forks, ND (US); Michael J. Holmes, Thompson, ND (US); John H. Pavlish, East Grand Forks, MN (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 154 days.

(21) Appl. No.: 12/429,058

(22) Filed: Apr. 23, 2009

(65) Prior Publication Data

US 2009/0297413 A1  Dec. 3, 2009

Related U.S. Application Data

(60) Continuation-in-part of application No. 12/201,595, filed on Aug. 29, 2008, now abandoned, which is a division of application No. 11/209,163, filed on Aug. 22, 2005, now Pat. No. 7,435,286.

(60) Provisional application No. 60/605,640, filed on Aug. 30, 2004.

(51) Int. Cl.
 *B01D 53/02* (2006.01)
 *F23J 11/00* (2006.01)
 *B01D 47/00* (2006.01)

(52) U.S. Cl.
 USPC .............. 95/142; 95/134; 110/345; 423/210

(58) Field of Classification Search
 USPC ..................... 95/134, 142; 110/345; 423/210
 See application file for complete search history.

(56) References Cited

U.S. PATENT DOCUMENTS

| | | |
|---|---|---|
| 1,984,164 A | 12/1934 | Stock |
| 3,194,629 A | 7/1965 | Dreibelbis et al. |

(Continued)

FOREIGN PATENT DOCUMENTS

| | | |
|---|---|---|
| CA | 1099490 | 4/1981 |
| CA | 2150529 | 12/1995 |

(Continued)

OTHER PUBLICATIONS

Dunham, G.E. et al., *Mercury Capture by an Activated Carbon in a Fixed-Bed Bench-Scale System*, Environmental Progress vol. 17, No. 3, pp. 203-208.

(Continued)

*Primary Examiner* — Amber Orlando
(74) *Attorney, Agent, or Firm* — Merchant & Gould, P.C.

(57) ABSTRACT

A promoted carbon and/or non-carbon base sorbent are described that are highly effective for the removal of mercury from flue gas streams. The promoted sorbent comprises a carbon and/or non-carbon base sorbent that has reacted with and contains forms of halogen and halides. Optional components may be added to increase and/or preserve reactivity and mercury capacity. These may be added directly with the base sorbent, or in-flight within a gas stream (air, flue gas, etc.), to enhance base sorbent performance and/or mercury capture. Mercury removal efficiencies obtained exceed conventional methods. The promoted sorbent can be regenerated and reused. Base sorbent treatment and preparation methods are also described. Methods for in-flight preparation, introduction, and control of the active base sorbent into the mercury contaminated gas stream are described.

30 Claims, 5 Drawing Sheets

(56) References Cited

U.S. PATENT DOCUMENTS

| | | | | |
|---|---|---|---|---|
| 3,662,523 | A | 5/1972 | Revoir | |
| 3,786,619 | A | 1/1974 | Melkersson | |
| 3,826,618 | A | 7/1974 | Capuano | |
| 3,849,267 | A | 11/1974 | Hilgen | |
| 4,101,631 | A | 7/1978 | Ambrsini et al. | |
| 4,196,173 | A | 4/1980 | Delong et al. | |
| 4,500,327 | A | 2/1985 | Nishino et al. | |
| 4,530,765 | A * | 7/1985 | Sabherwal | 210/663 |
| 4,708,853 | A | 11/1987 | Matviya | |
| 4,786,483 | A | 11/1988 | Audeh | |
| 4,814,152 | A | 3/1989 | Yan | |
| 4,820,318 | A | 4/1989 | Chang et al. | |
| 4,889,698 | A | 12/1989 | Moller | |
| 4,956,162 | A | 9/1990 | Smith | |
| 5,245,120 | A * | 9/1993 | Srinivasachar et al. | 588/256 |
| 5,288,306 | A * | 2/1994 | Aibe et al. | 95/141 |
| 5,300,137 | A | 4/1994 | Weyand et al. | |
| 5,346,674 | A * | 9/1994 | Weinwurm et al. | 422/168 |
| 5,409,522 | A | 4/1995 | Durham et al. | |
| 5,419,834 | A * | 5/1995 | Straten | 210/198.1 |
| 5,435,980 | A * | 7/1995 | Felsvang et al. | 423/210 |
| 5,505,766 | A | 4/1996 | Chang | |
| 5,575,982 | A | 11/1996 | Reiss et al. | |
| 5,607,496 | A | 3/1997 | Brooks | |
| 5,672,323 | A | 9/1997 | Bhat | |
| 5,695,726 | A | 12/1997 | Lerner | |
| 5,827,352 | A | 10/1998 | Altman | |
| 5,891,324 | A | 4/1999 | Ohtsuka | |
| 6,027,551 | A | 2/2000 | Hwang | |
| 6,080,281 | A * | 6/2000 | Attia | 204/157.3 |
| 6,136,072 | A | 10/2000 | Sjostrom | |
| 6,136,749 | A * | 10/2000 | Gadkaree et al. | 502/183 |
| 6,214,304 | B1 | 4/2001 | Rosenthal | |
| 6,258,334 | B1 | 7/2001 | Gadkaree | |
| 6,372,187 | B1 | 4/2002 | Madden et al. | |
| 6,375,909 | B1 | 4/2002 | Dangtran et al. | |
| 6,383,981 | B1 | 5/2002 | Blankenship | |
| 6,471,936 | B1 * | 10/2002 | Chen et al. | 423/658.2 |
| 6,528,030 | B2 | 3/2003 | Madden et al. | |
| 6,818,043 | B1 | 11/2004 | Chang et al. | |
| 6,848,374 | B2 | 2/2005 | Srinivasachar et al. | |
| 6,878,358 | B2 | 4/2005 | Vosteen et al. | |
| 6,942,840 | B1 | 9/2005 | Broderick | |
| 6,953,494 | B2 | 10/2005 | Nelson, Jr. | |
| 7,435,286 | B2 | 10/2008 | Olson et al. | |
| 7,514,052 | B2 | 4/2009 | Lissianski et al. | |
| 7,938,571 | B1 | 5/2011 | Irvine | |
| 7,942,566 | B1 | 5/2011 | Irvine | |
| 2001/0002387 | A1 | 5/2001 | Tsutsumi et al. | |
| 2001/0003116 | A1 | 6/2001 | Neufert | |
| 2002/0033097 | A1 * | 3/2002 | El-Shoubary et al. | 95/134 |
| 2002/0134242 | A1 * | 9/2002 | Yang et al. | 95/107 |
| 2002/0150516 | A1 | 10/2002 | Pahlman et al. | |
| 2003/0136509 | A1 * | 7/2003 | Virtanen | 156/310 |
| 2003/0206843 | A1 | 11/2003 | Nelson, Jr. | |
| 2004/0003716 | A1 | 1/2004 | Nelson, Jr. | |
| 2004/0013589 | A1 | 1/2004 | Vosteen et al. | |
| 2004/0109800 | A1 * | 6/2004 | Pahlman et al. | 423/210 |
| 2005/0000197 | A1 * | 1/2005 | Krantz | 55/385.3 |
| 2005/0019240 | A1 | 1/2005 | Lu et al. | |
| 2005/0074380 | A1 * | 4/2005 | Boren et al. | 423/1 |
| 2005/0147549 | A1 * | 7/2005 | Lissianski et al. | 423/210 |
| 2005/0227146 | A1 * | 10/2005 | Ghantous et al. | 429/231.7 |
| 2006/0048646 | A1 | 3/2006 | Olson et al. | |
| 2006/0057044 | A1 * | 3/2006 | Chang et al. | 423/210 |
| 2006/0112823 | A1 * | 6/2006 | Avina | 95/90 |
| 2007/0168213 | A1 * | 7/2007 | Comrie | 705/1 |
| 2007/0295347 | A1 * | 12/2007 | Paine et al. | 131/342 |
| 2008/0134888 | A1 * | 6/2008 | Chao et al. | 95/134 |
| 2008/0207443 | A1 * | 8/2008 | Gadkaree et al. | 502/417 |
| 2009/0081092 | A1 * | 3/2009 | Yang et al. | 423/210 |

FOREIGN PATENT DOCUMENTS

| | | |
|---|---|---|
| CA | 2400898 | 8/2001 |
| DE | 3426059 | 1/1986 |
| DE | 10233173 | 3/2006 |
| EP | 0208490 A1 | 1/1987 |
| JP | 49-53593 | 5/1974 |
| JP | 49-43197 | 11/1974 |
| JP | 50-6438 | 3/1975 |
| WO | 01/62368 | 8/2001 |
| WO | WO 2006/039007 A2 | 4/2006 |
| WO | WO 2006/099611 | 9/2006 |

OTHER PUBLICATIONS

Felsvang, K. et al., *Mercury Reduction and Control Options*, The U.S. EPA-DOE-EORI Combined Power Plant Air Pollutant Control Symposium: The Mega Symposium and the A&WMA Specialty Conference on Mercury Emissions: Fate, Effects and Control. Aug. 20-23, 2001, Chicago, Illinois, pp. 1-19.

Ghorishi, B; Guller, B.K., *Sorption of Mercury Species by Activated Carbons and Calcium-Bases Sorbents: Effect of Temperature, Mercury Concenitration and Acid Gases*, Waste Manage. Res. 1998, 16, 6 582-593.

Lancia, A.; Musmarra, D.; Pepe, F.; Volpicelli, G., *Adsorption of Mercuric Chloride Vapours from Incinerator Flue Gases on Calcium Hydroxide Particles*, Combust. Sci. & Technol. 1993, 93, 277.

Olson, D.G.; et al., *The Reduction of Gas Phase Air Toxics from Combustion and Incineration Sources using the MET-Mitsui-BF Activated Coke Process*, Fuel Processing Technology, 65-66 (2000) 393-405.

B. Vosteen et al.,*Chlor-und Bromgestützte Hg-Sorption an Elektrofilter-Flugaschen eines kohlegefeuerten Schmelzkammerkessels und an Zementrohmehl*, Matin-Luther-Universität Halle-Wittenberg, Sep. 2003, pp. 1-30.

Ha et al., "Effect of unburnt carbon on the corrosion performance of fly ash cement mortar," Construction and Building Materials, Sep. 1, 2005.

Supplementary European Search Report, dated Dec. 6, 2012.

Chinese Office Action, dated Jun. 25, 2013 (and English translation).

* cited by examiner

SORBENTS FOR THE OXIDATION AND REMOVAL OF MERCURY

CROSS-REFERENCE TO RELATED APPLICATIONS

This application is a continuation-in-part of U.S. patent application Ser. No. 12/201,595 filed on Aug. 29, 2008, which is a division of U.S. patent application Ser. No. 11/209,163, filed on Aug. 22, 2005 (now U.S. Pat. No. 7,435,286), which claims priority from provisional application 60/605,640, filed on Aug. 30, 2004. The disclosures of U.S. patent application Ser. Nos. 12/201,595; 11/209,163; and 60/604,640 are hereby incorporated herein by reference to the extent appropriate.

BACKGROUND OF THE INVENTION

1. Technical Field of the Invention

The present invention relates to methods and materials for the removal of pollutants from flue gas or product gas from a gasification system. In particular, mercury is removed from gas streams generated during the burning or gasification of fossil fuels by highly reactive regenerable sorbents.

2. Background of the Invention

The combustion and gasification of fossil fuel such as coal generates flue gas that contains mercury and other trace elements that originate from the fuel. The release of the mercury (and other pollutants) to the environment must be controlled by use of sorbents, scrubbers, filters, precipitators, and other removal technologies. Mercury is initially present in the elemental form during combustion and gasification. In downstream process sections, such as in the ducts and stack of a combustion system, some of the elemental mercury is oxidized. The amount that is oxidized depends on the amount of acid gases present in the flue gas and other factors. Amounts of mercury vary with the fuel, but concentrations of mercury in the stream of flue gas from coal combustion are typically less than 5 parts per billion (ppb). Large coal combustion facilities such as electric utilities may emit a pound of mercury, or more, a day. Mercury removal applications include, without limitation, flue gas from coal (or other fossil fuel) combustion, waste incineration, product gas from gasification, as well as off gases from mineral processing, metal refining, retorting, cement manufacturing, chloralkali plants, dental facilities, and crematories.

Mercury Sorbent Technologies

Several types of mercury control methods for flue gas have been investigated, including injection of fine sorbent particles into a flue gas duct and passing the flue gas through a sorbent bed. Fine-particle injection sorbents include activated carbon, metal oxide sorbent, sodium sulfide particles, and basic silicate or oxide sorbents. When particle injection is employed, the mercury captured on the sorbent particles is removed from the gas stream in a particulate control device such as a baghouse or electrostatic precipitator (ESP) and collected along with ash particulate. The sulfide and basic silicate and oxide particles are effective only for the oxidized mercury, and the metal oxide sorbents exhibit slower capture kinetics than the carbon particles. Additionally, injection of fine carbon particles into the flue gas stream has been only partially successful in removing mercury, especially elemental mercury, where effective removal of only about 60% is attained for some applications with a FF (fabric filter) to collect carbon and ash. Even lower removal rates have been observed when an ESP is used to collect the carbon because the contact time of the carbon with the gas is very short.

A major problem with existing carbon injection systems is that the sorbent is relatively unreactive toward mercury. Consequently, these sorbents must be used in large amounts, at high sorbent-to-mercury ratios, to effectively capture the mercury. These sorbents tend to be relatively expensive and cannot be easily separated from the ash for regeneration and reuse. The collection of carbon in the ash also creates solid waste disposal problems, and the spent sorbent may contaminate the collected ash, preventing its use in various applications.

One solution has been to add an oxidative sorbent comprising an aluminosilicate material impregnated with a very heavy dosage of one or more oxidative metal halides plus activated carbon. For example, refer to Varma et al. (20070140940). However, the amounts of metal salts required for Hg oxidation are generally relatively large and expensive. Also, several of the salts that can be used in such a process are highly toxic. Although the metal salts are present for oxidation in this process, activated carbon is essential for getting adsorption of the Hg. As such, there is no synergistic role for the aluminosilicates as they appear to be only a support for the oxidizing salts.

Another approach has been the injection of aluminosilicate particulate such as bentonite, which contains neither oxidizing salts nor halogen complexes with a Lewis base site, and thus lacks the more powerful oxidizing capability of the said complexes as described in this application. For example, see U.S. Pat. No. 7,413,719. Additionally, the injection of an aluminosilicate (kaolin or metakaolin) containing calcium hypochlorite which thermally decomposes to form halogen is also known. For example, see U.S. Patent Application No. 20030103882. Thus these and similar impregnated aluminosilicate technologies require time in flight at appropriate high temperatures to heat the impregnated salt(s) to generate an oxidation site. This clearly represents a kinetic barrier to activation in contrast to the extremely fast complexing reaction of the Lewis acid on the surface of the appropriate Lewis base sorbent described in the present patent. The kinetic barrier is only for heating up the calcium hypochlorite to decompose it to Cl atoms or molecules. Halogen (bimolecular or atomic) would complex with carbon or noncarbon at any lower temperature to form reactive oxidation sites. Also, halide would require a very high temp or strong acid to form reactive halogen or halogen complex.

Yet another approach is the injection of bentonite plus a metal sulfide and a metal salt, none of which is oxidizing to elemental mercury and would require a slow thermal activation step. For example, see U.S. Patent Application No. 20070119300.

The injection of halogen or halogen precursors in a hot zone, followed by contact with an alkaline material in a wet or dry scrubber is another approach known in the art. With such an approach, elemental mercury is claimed to be oxidized by the halogen to Hg(II) which is collected by the alkaline material in the scrubber. For example, see U.S. Pat. No. 6,808,692 (Oehr), U.S. Pat. No. 3,849,267 (Hilgen), U.S. Pat. No. 5,435,980 (Felsvang), U.S. Pat. No. 6,375,909 (Dangtran), U.S. Patent Application No. 20020114749 (Cole), U.S. Pat. No. 6,638,485 (Iida), U.S. Patent Application No. 20030185718 (Sellakumar), U.S. Patent Application No. 20030147793 (Breen), and U.S. Pat. No. 6,878,358 (Vosteen). However, even though it is known to inject halogen forms at some stage of the combustion process, such a process does not utilize a complexing method on a sorbent surface for conducting the oxidation and capture. Further, the alkaline material is rapidly surface-coated by the large concentrations of acid gases, lowering its capacity for adsorption of Hg(II). It is also recognized that the halogen forms initially introduced or generated are far more reactive to the large concentrations of $SO_2$ and moisture in the flue gas, and so gas-phase reactions of the halogens with Hg are hindered. In contrast, the present invention takes advantage of the Lewis acid complexes that rapidly form on the sorbent surface to effect the Hg oxidation, rather than rely on gas phase reactions for oxidation. Thus HCl, HBr, $SO_2Br$, and other gas-phase products all festoon the surface and promote the activity of the sorbent by forming complexes with the sorbent to form a promoted sorbent.

Accordingly, there remains a need for more economical and effective mercury removal technology. This invention provides for cost-effective removal of pollutants, including mercury, using sorbent enhancement additives and/or highly reactive sorbents, with contact times of seconds (or less), and that may be regenerated and reused.

SUMMARY

The various embodiments of the present invention overcome the various aspects of the deficiencies of the prior art and provide new and economical methods for the removal of mercury from the gases produced in the utilization of fossil fuels.

A halogen/halide-promoted sorbent is described that is highly effective for the removal of mercury from flue gas streams. The sorbent comprises any activated carbon and/or non-carbon compound, such as porous or vesicular felsic or basaltic materials, clay-based compounds, alkaline compounds, calcium hydroxide compounds, sodium acetate compounds, and/or bicarbonate compounds, or a combination thereof. Optional secondary components and alkali may be added to further increase reactivity and mercury capacity. Mercury removal efficiencies obtained exceed or match conventional methods with added benefits such as reduced costs. Optionally, the promoted sorbent can be regenerated and reused. Sorbent treatment and/or preparation methods are also described. Methods for in-flight preparation, introduction, and control of the sorbent, promoter and promoted sorbent into the mercury contaminated gas stream are described.

When a promoted or a non-promoted base sorbent reacts with elemental or oxidized mercury, a mercury/sorbent chemical composition is formed and, in the case of elemental mercury reacting with the promoted base sorbent, the mercury is oxidized. As discussed in further detail in other portions of the specification, the base sorbent may be either a carbon or a non-carbon material or a combination thereof. Additionally, the mercury/sorbent chemical composition may be comprised of covalent bonds, ionic bonds and/or chemical complexes between the promoted or non-promoted base sorbent and the oxidized mercury. The Lewis basic groups on the non-promoted base sorbent, or the non-promoted portions of a promoted base sorbent, are available for reaction with the Lewis acid groups of already existing oxidized mercury in the mercury containing gas. Thus, mercury may be removed from the mercury containing gas stream through the formation of multiple and various mercury/sorbent chemical compositions even within the same process. For example, multiple sites on a sorbent particulate can form multiple and various mercury/sorbent chemical compositions in the case where only a portion of the sites on the base sorbent particulate are promoted.

In some embodiments, a carbon and/or non-carbon promoted sorbent and/or a combination thereof is provided comprising a sorbent structure that has reacted with a promoter selected from the group consisting of halides, halogens, and combinations thereof, such that the reaction product is effective for the removal of mercury from a gas stream. The carbon sorbent comprises reactive Lewis acid groups/sites; the non-carbon sorbent comprises reactive Lewis basic groups/sites.

In an embodiment, a promoted carbon and/or non-carbon sorbent is provided wherein the base sorbent is selected from the group consisting of carbon, activated carbon, porous or vesicular felsic and basaltic materials, clay-based compounds, alkaline compounds, calcium hydroxide compounds, sodium acetate compounds, and/or bicarbonate compounds, or a combination thereof, with an average particle size similar to that of fly ash produced from a thermal process (combustion or gasification) or greater than that of fly ash produced such that it is physically separable therefrom, and combinations thereof, and the promoter is selected from the group consisting of molecular halogens, Group V (CAS nomenclature is used throughout) halides, Group VI halides, hydrohalides, and combinations thereof. In an embodiment, the promoted sorbent (carbon, non-carbon, or their combination) may have a mass mean particle diameter such that it can be substantially separated by physical means from entrained ash in the gas stream from which mercury is to be removed. In an embodiment, the base sorbent (carbon, non-carbon, or their combination) may have a mass mean particle diameter greater than about 40 micrometers.

In another embodiment, the promoted sorbent comprises from about 1 to about 30 grams of promoter per 100 grams of base sorbent. Another embodiment further comprises an optional secondary component comprising a halogen or a hydrohalide such that the reactivity and mercury capacity of the promoted sorbent are enhanced.

In another embodiment, the concentration of the optional secondary component on the finished sorbent is within the range of from about 1 to about 15 wt % of the concentration of the promoter on the finished sorbent.

In another embodiment, an optional alkali component may preferably be added to provide a synergistic effect through combination of this alkali with the base sorbent.

In another embodiment, the optional secondary component is selected from the group consisting of Group V halides, Group VI halides, HI, HBr, HCl, and combinations thereof. In another embodiment, the promoter is substantially in vapor form when combined with the base sorbent. In another embodiment, the promoter is combined with an organic solvent prior to reaction with the base sorbent. In another embodiment, the promoter and optional secondary component are combined with the base sorbent substantially simultaneously. Another embodiment further comprises adding a mercury-stabilizing reagent selected from the group consisting of S, Se, $H_2S$, $SO_2$, $H_2Se$, $SeO_2$, $CS_2$, $P_2S_5$, and combinations thereof. Another embodiment further comprises adding an optional alkali component.

In an embodiment, a method is provided comprising providing a granular base sorbent and reacting the base sorbent with a promoter selected from the group consisting of halogens, halides, and combinations thereof, such that the reaction product comprises a promoted sorbent effective for removal of mercury from a gas stream. In a further embodiment, the reaction product comprises from about 1 to about 30 grams of promoter per 100 grams of base sorbent. In another embodiment the reaction product has an average particle-size distribution greater than the average size of entrained ash particles in the gas stream from which mercury is to be removed, such that the reaction product can be substantially removed from the entrained ash particles by physical means. In another embodiment, the reaction product has a mass mean particle diameter greater than about 40 micrometers.

In another embodiment, the promoter is selected from the group consisting of molecular halogens, hydrohalides, Group V halides, Group VI halides, and combinations thereof. In another embodiment, the promoter is in the gas phase when contacting the base sorbent (carbon, non-carbon, or their combination). In another embodiment, the promoter is in an organic solvent when contacting the base sorbent (carbon, non-carbon, or their combination).

In another embodiment, the promoter is selected from the group consisting of $Br_2$, a Group V bromide, a Group VI bromide, and combinations thereof.

In another embodiment, the method further comprises reacting the granular non-carbon with an optional secondary component comprising a halogen or a hydrohalide such that the reactivity and mercury capacity of the promoted sorbent are enhanced. In another embodiment, the promoter and optional secondary component are contacted simultaneously with the non-carbon base sorbent. In another embodiment, the method further comprises adding a mercury-stabilizing reagent selected from the group consisting of S, Se, $H_2S$, $SO_2$, $H_2Se$, $SeO_2$, $CS_2$, $P_2S_5$, and combinations thereof. In an embodiment, a method is provided for control of mercury in a flue gas with substantially lower sorbent requirements. Through enhanced sorbent reactivity, mercury removal per gram of sorbent is increased, thereby decreasing the capital and operating costs by decreasing sorbent requirements.

In an embodiment, the promoted sorbent is introduced by direct injection into the flue gas stream. In another embodiment, the base sorbent is promoted within the flue gas stream In an embodiment, a method is provided for reducing mercury in flue gas comprising providing a base sorbent, either by injection or in situ creation, into a mercury-containing flue gas stream, collecting greater than 70 wt % of the mercury in the flue gas on the promoted sorbent to produce a cleaned flue gas, and substantially recovering the promoted sorbent from the cleaned flue gas. In embodiments where less than 70 wt % mercury removal is desired, the required removal is attained using less base sorbent as would be required with standard base sorbent. In a further embodiment, the method further comprises monitoring the mercury content of the clean flue gas, regenerating the recovered promoted sorbent, and using the monitored mercury content of the cleaned flue gas to control the rate of base sorbent and promoter. In another embodiment the injected promoted sorbent is prepared in-flight by reacting a base sorbent (carbon, non-carbon, or their combination) and a promoter within a pneumatic transport line from which the reaction product is injected to the mercury-containing flue gas stream.

In another embodiment, the promoter is selected from the group consisting of molecular halogens, halides, and combinations thereof. In another embodiment, the promoter is reacted in the gas phase or as a vapor. In another embodiment, the promoter is added at from about 1 to about 30 grams per 100 grams of the base sorbent (carbon, non-carbon, or their combination).

In another embodiment, the injected promoted sorbent is prepared in-flight by reacting a base sorbent (carbon, non-carbon, or their combination), a promoter, and an optional secondary component to enhance the reactivity and capacity of the promoted sorbent within a pneumatic transport line from which the reaction product is injected to the mercury-containing flue gas stream.

In another embodiment, the optional secondary component is selected from the group consisting of iodine, hydrohalides, Group V halides, Group VI halides, and combinations thereof. In another embodiment, the optional secondary component is added at from about 1 to about 15 wt % of the promoter content. In another embodiment, the method further comprises adding to the promoted sorbent a mercury-stabilizing reagent selected from the group consisting of S, Se, $H_2S$, $SO_2$, $H_2Se$, $SeO_2$, $CS_2$, $P_2S_5$, and combinations thereof.

In an embodiment, the method further comprises coinjecting an optional alkaline material, including without limitation alkaline and alkaline-earth components, to improve the efficiency of mercury capture by capturing oxidized mercury and/or capturing gaseous components that might otherwise reduce promoted sorbent capacity. In another embodiment, the optional alkaline material may preferably comprise calcium oxide, sodium carbonate, and the like, as are known in the art.

In another embodiment, the method further comprises using the monitored mercury content of the cleaned flue gas to control the composition of the promoted sorbent. In another embodiment, the promoted sorbent is prepared in-flight by reacting a base sorbent (carbon, non-carbon, or their combination) and a promoter within the flue gas stream or in a transport line from which the reaction product is injected to the mercury-containing flue gas stream, wherein the promoter is selected from the group consisting of molecular halogens, halides, and combinations thereof, wherein the promoter is reacted in the gas phase or as a vapor, wherein the promoter is added at from about 1 to about 30 grams per 100 grams of the base sorbent (carbon, non-carbon, or their combination), wherein the rate at which the promoter is added and the rate of promoted sorbent injection are determined by a digital computer based, at least in part, on the monitored mercury content of the cleaned flue gas.

In an embodiment, a method for reducing the mercury content of a mercury and ash-containing gas stream is provided wherein particulate carbon and/or non-carbon promoted sorbent with a mass mean size greater than 40 μm is injected into the gas stream, mercury is removed from the gas by the promoted sorbent particles, the promoted sorbent particles are separated from the ash particles on the basis of size, and the promoted sorbent particles are reinjected to the gas stream. In another embodiment, the mercury-containing promoted sorbent particles are regenerated to remove some or substantially all of the mercury. In another embodiment, an alkaline component is coinjected into the gas stream. In another embodiment, the promoted sorbent may further comprise a promoter. The promoter may preferably comprise a halide, a halogen, or both.

In an embodiment, a method for reducing mercury in a mercury-containing gas to a desired level is disclosed. The method comprises reacting a carbon base sorbent with at least one promoter selected from the group consisting of molecular halogens, halides, and combinations thereof to produce a promoted carbon sorbent; allowing said promoted carbon sorbent to interact with a mercury-containing gas to capture mercury in the mercury-containing gas on the promoted sorbent to produce a cleaned gas; and monitoring the mercury content of the cleaned gas. In some embodiments, the carbon base sorbent and the promoter are introduced into the mercury-containing gas at the same location or at separate locations. In some embodiments, the carbon base sorbent or promoter or combination thereof is introduced into the mercury-containing gas at one or more locations. In an embodiment, the rate at which the carbon base sorbent is introduced or the rate at which the promoter is introduced or combination thereof is adjusted according to the monitored mercury content of the cleaned gas so that the mercury content of the cleaned gas is maintained at substantially the desired level with minimal operating cost.

In a further embodiment, the method comprises reacting a non-carbon base sorbent with at least one promoter selected from the group consisting of molecular halogens, halides, and combinations thereof to produce a promoted non-carbon sorbent; allowing said promoted non-carbon sorbent to interact with a mercury-containing gas to capture mercury in the mercury-containing gas on the promoted sorbent to produce a cleaned gas; and monitoring the mercury content of the cleaned gas. In some embodiments, the non-carbon base sorbent and the promoter are introduced into the mercury-containing gas at the same location or at separate locations. In some embodiments, the non-carbon base sorbent or promoter or combination thereof is introduced into the mercury-containing gas at one or more locations. In an embodiment, the rate at which the non-carbon base sorbent is introduced or the rate at which the promoter is introduced or combination thereof is adjusted according to the monitored mercury content of the cleaned gas so that the mercury content of the cleaned gas is maintained at substantially the desired level with minimal operating cost.

In a further embodiment, a method for reducing mercury in a mercury-containing gas to a desired level is presented. The method comprises reacting a base sorbent with at least one promoter selected from the group consisting of molecular halogens, halides, and combinations thereof to produce a promoted sorbent, wherein said base sorbent is selected from the group consisting of a non-carbon material, a carbon material, and combination thereof; allowing said promoted sorbent to interact with a mercury-containing gas to capture mercury in the mercury-containing gas on the promoted sorbent to produce a cleaned gas; and monitoring the mercury content of the cleaned gas.

In some embodiments, the base sorbent and the promoter are introduced into the mercury-containing gas at the same location or at separate locations. In some embodiments, the base sorbent or promoter or combination thereof is introduced into the mercury-containing gas at one or more locations. In some embodiments, introducing the base sorbent and the promoter comprises injecting the base sorbent and the promoter into the mercury-containing gas. In some embodiments, the promoter is introduced into the mercury-containing gas upstream of the introduction of the base sorbent. In some embodiments, the promoter is introduced upstream of a boiler or a combustion chamber. In an embodiment, the rate at which the base sorbent is introduced or the rate at which the promoter is introduced or combination thereof is adjusted according to the monitored mercury content of the cleaned gas so that the mercury content of the cleaned gas is maintained at substantially the desired level with minimal operating cost.

In an embodiment, the base sorbent for the promoted sorbent is selected from the group consisting of carbon, activated carbon, porous felsic materials, vesicular felsic materials, porous basaltic materials, vesicular basaltic materials, clay-based compounds, alkaline compounds, calcium hydroxide compounds, sodium acetate compounds, bicarbonate compounds, and combinations thereof. In embodiments, the non-carbon material comprises Lewis basic groups and the carbon material comprises Lewis acid groups. In some cases, the non-carbon material comprises amorphous forms of tectosilicates comprising nanoscale cavities lined with Lewis basic oxygen associated with alkaline-earth metals. The alkaline-earth metals comprise Group I and Group II alkaline-earth metals. In some other cases, the non-carbon material comprises amorphous forms of phyllosilicates comprising nanoscale cavities lined with Lewis basic oxygen.

In an embodiment, the promoted sorbent comprises metastable complexes formed between the promoter of this disclosure and inorganic species on the non-carbon base sorbent. In some embodiments, the inorganic species is selected from the group consisting of sodium compounds, calcium compounds, magnesium compounds, aluminum compounds, iron compounds, and combinations thereof. In an embodiment, the promoted sorbent comprises metastable complexes formed between the promoter of this disclosure and metal-oxygen-metal structures on the non-carbon base sorbent. In some embodiments, the promoter after being complexed with the metal-oxygen-metal structures is in the form selected from the group consisting of a dihalogen group, a halogen atom, a hydrohalogen group, a Group V halide, a Group VI halide, and combinations thereof. In an embodiment, the promoted sorbent comprises activated Lewis basic groups or activated Lewis acid groups or combination thereof. In some embodiments, the interaction between promoted sorbent and said mercury-containing gas stream comprises mercury diffusing from the gas phase onto said promoted sorbent surface; and reacting with the activated Lewis basic groups or activated Lewis acid groups or combination thereof to cause chemisorption on the promoted sorbent surface.

In an embodiment, the method for reducing mercury in a mercury-containing gas to a desired level further comprises pretreating the base sorbent to increase the number of Lewis basic groups or Lewis acid groups or combination thereof. In some cases, the pretreating methods comprise chemical treatment, thermal treatment, vacuum treatment, and combinations thereof. In some embodiments, chemical treatment comprises acid treatment and alkaline treatment. In an embodiment, the method for reducing mercury in a mercury-containing gas to a desired level further comprises introducing an alkali component into the mercury-containing gas.

As will be described in more detail below, the present invention thus provides several advantages over previously known techniques, including significantly more effective and economical mercury sorbents for effluent gases, advantageously applicable to treating gas streams from combustion and gasification systems.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiments of the present invention, reference will now be made to the accompanying drawings.

DETAILED DESCRIPTION

Herein will be described in detail specific preferred embodiments of the present invention, with the understanding that the present disclosure is to be considered an exemplification of the principles of the invention and is not intended to limit the invention to that illustrated and described herein. The present invention is susceptible to preferred embodiments of different forms or order and should not be interpreted to be limited to the specifically expressed methods or compositions contained herein. In particular, various preferred embodiments of the present invention provide a number of different configurations and applications of the inventive method, compositions, and their uses.

The present invention provides a cost-effective way to capture pollutants by utilizing exceptionally reactive halogen/halide-promoted sorbents using a bromide (or other halogen/halide) treatment of the promoted sorbent, that capture mercury via mercury-sorbent surface reactions, at very short contact times of seconds or less. The reactivity of the promoted sorbent toward the pollutants (i.e., mercury) is greatly enhanced, and the sorption capacity can be regenerated; i.e., the promoted sorbent may be regenerated, recycled and/or reused.

The treated base sorbents (carbon, non-carbon, or their combination), treatment techniques, and optional additives discussed herein have applicability to mercury control from the product or effluent gas or gases from gasification systems, syngas generators, and other mercury-containing gas streams, in addition to the flue gas from combustion systems. Thus it should be understood that the terms combustion system and flue gas as used throughout this description may apply equally to gasification systems and syngas or fuel gas, as will be understood by those skilled in the art.

Hereinafter the disclosure may at times discuss the use of carbon base sorbents in further details; however the use of non-carbon base sorbents and a combination of carbon and non-carbon base sorbents is also contemplated to at least the same degree as carbon base sorbents.

Figure 1:
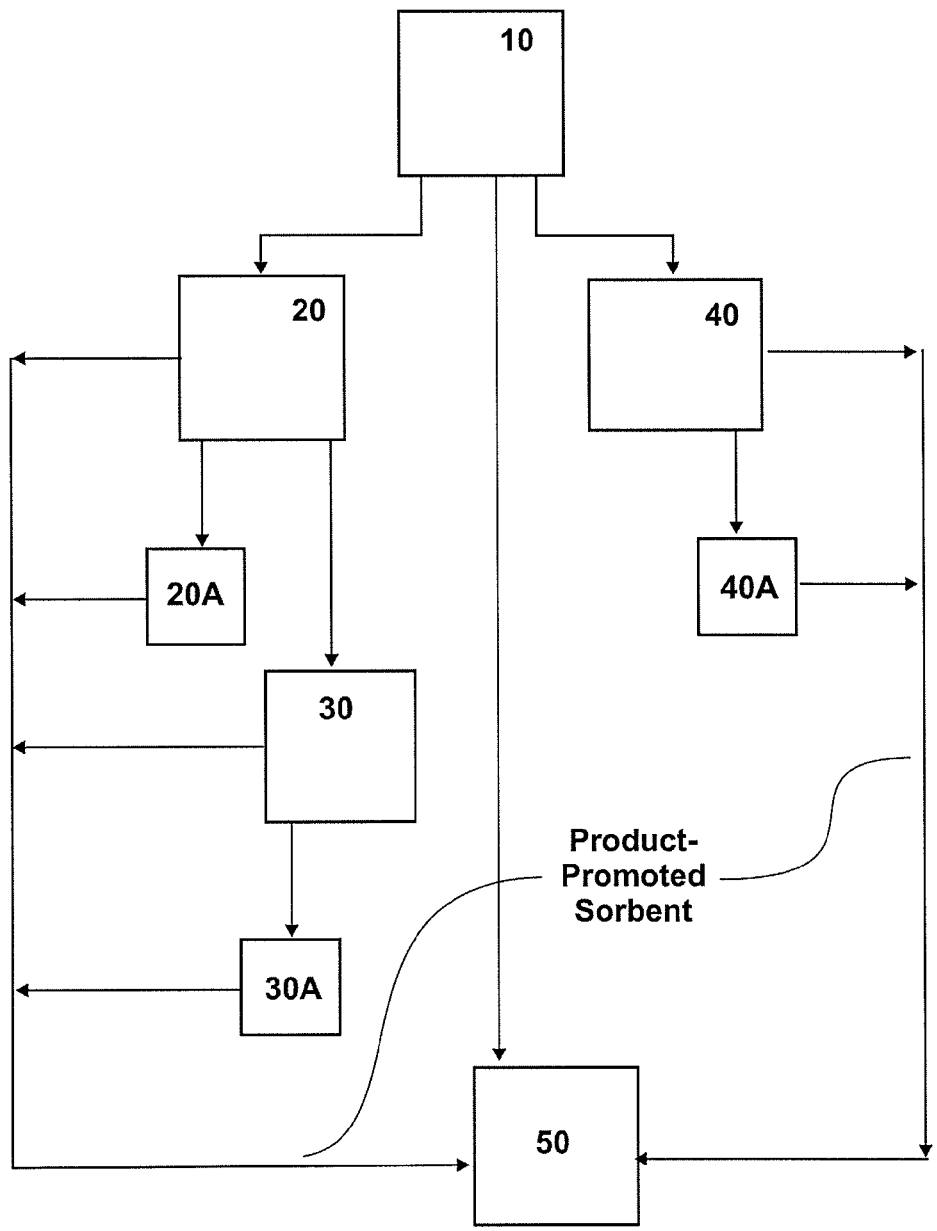
FIG. 1 schematically illustrates methods for preparation of promoted carbon and/or non-carbon sorbents in accordance with the present invention.

Referring now to FIG. 1, there is shown a block flow diagram illustrating some preferred embodiments of the process of the present invention to prepare promoted sorbents useful for mercury capture in a mercury containing gas, such as a flue gas and/or product gas from gasification system streams. In a preferred embodiment illustrated by path 10-20, block 10 illustrates providing a base sorbent while block 20 illustrates adding a halogen or halide promoter that reacts with the base sorbent to produce a product-promoted sorbent. In embodiments where the halogen or halide is added, for example, as a vapor, no further steps may be necessary. In embodiments where the halogen or halide is added in, for example, a solvent, it may be desirable to employ solvent removal as illustrated by block 20A to produce a product-promoted sorbent suitable for injection.

Referring still to FIG. 1, another preferred embodiment of the process of the present invention is illustrated by path 10-20-30, comprising providing a base sorbent as shown by block 10, adding a halogen or halide promoter that reacts with the base sorbent, illustrated at block 20, and adding a secondary component illustrated at block 30 that reacts with the result of block 20 to produce a product-promoted sorbent. In embodiments where both the halogen or halide promoter and the secondary component are added, for example, as a vapor, no further steps may be necessary. In embodiments where the halogen or halide promoter and/or secondary component are added in, for example, a solvent, it may be desirable to employ solvent removal as illustrated by block 30A to produce a product-promoted sorbent suitable for injection.

Referring still to FIG. 1, another preferred embodiment of the process of the present invention is illustrated by path 10-40, comprising providing a base sorbent as illustrated at block 10 and adding a halogen or halide promoter and a secondary component to the base sorbent together, with which they react to produce a product-promoted sorbent as illustrated by block 40. As above, in embodiments where vapor additions are made to the base sorbent, no further steps may be desired. In embodiments where one or more components are added in solvent, a solvent removal step may be provided as illustrated by block 40A to produce a product-promoted sorbent suitable for injection.

Referring still to FIG. 1, another preferred embodiment of the process of the present invention is illustrated by path 10-50 in combination with path 20-50. In this embodiment, a base sorbent as illustrated by block 10 is introduced to the mercury containing gas as illustrated by block 50 while a halogen or halide promoter as illustrated by block 20 is introduced to the mercury containing gas stream. Thus the base sorbent and promoter react at block 50 to produce a product-promoted sorbent. In a similar manner, a secondary component as illustrated by block 30 may be added to the halogen or halide promoter as illustrated by block 20 and introduced into the mercury containing gas as illustrated by block 50. In embodiments where both the halogen or halide promoter and secondary component are added, for example, by vapor, no further steps may be taken. In embodiments where the halogen or halide and/or secondary component are added in, for example, a solvent, it may be desirable to employ solvent removal as illustrated by block 20A and/or block 30A.

Referring still to FIG. 1, also illustrated are preferred embodiments in which, as illustrated by block 50, a mercury containing gas stream is treated with product-promoted carbon sorbent prepared as described above.

In some preferred embodiments, the carbon base sorbent provided may preferably be any of several types, as understood by those skilled in the art. For example, the carbon base sorbent may include powdered activated carbon, granular activated carbon, carbon black, unburned carbon, carbon fiber, carbon honeycomb or plate structure, aerogel carbon film, pyrolysis char, regenerated activated carbon from product-promoted carbon sorbent, or other types as known in the art.

In some preferred embodiments, the carbon base sorbent provided may preferably have a mass mean particle size greater than the fly ash in a mercury containing gas, such as a flue gas stream, to be treated.

In some preferred embodiments, the carbon base sorbent provided may preferably have a mass mean particle diameter preferably greater than 40 micrometers, more preferably greater than 60 micrometers, or a particle-size distribution greater than that of the fly ash or entrained ash in a flue gas stream, or other mercury containing gas, to be treated, such that the activated carbon and ash can be separated by physical means.

In some preferred embodiments, the halogen or halide promoter that is added to, and reacts with, the carbon base sorbent may preferably comprise, by way of illustration and not limitation, a molecular halogen in vapor or gaseous form, a molecular halogen in an organic solvent, a Group V or Group VI halide, such as $PBr_3$ or $SCl_2$, respectively, in vapor, liquid, or solution form (though not in an aqueous solvent).

Embodiments are also provided in which the organic solvent may preferably comprise a chlorinated hydrocarbon, such as dichloromethane, a hydrocarbon solvent, including for example, petroleum ether, ligroin, pentane, hexane, toluene, and benzene, carbon disulfide, a waste solvent, an ether, a recycled solvent, a supercritical solvent, such as supercritical $CO_2$, water (though not in the case of a Group V or Group VI halide), and others as will be apparent to those of skill in the art.

Figure 4:
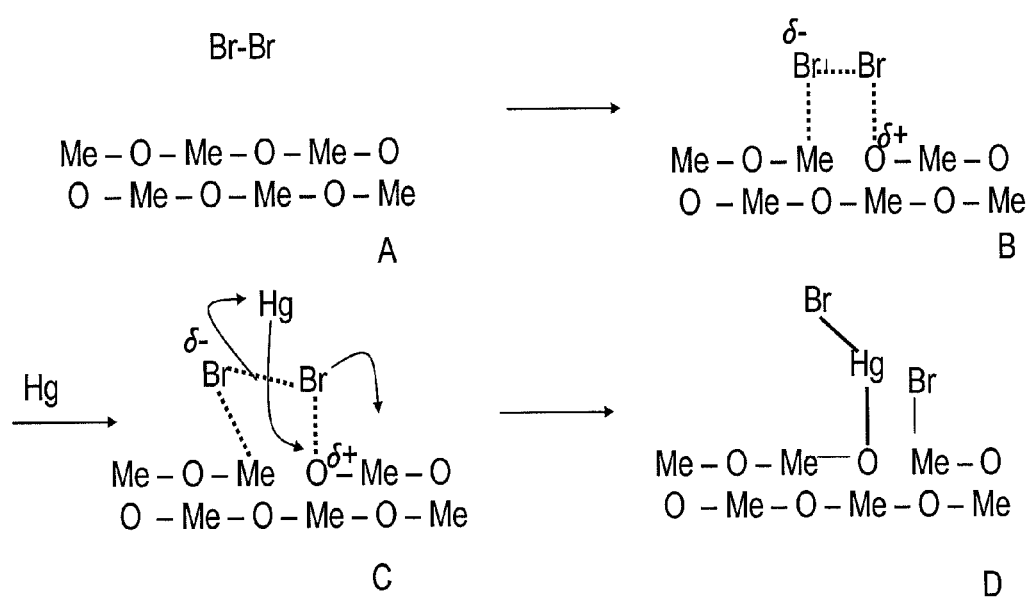
FIG. 4 illustrates a mechanism for promotion of metal oxide base sorbent via formation of a reactive halogen complex sorbent and subsequent capture of elemental mercury on the promoted sorbent.

Referring now to FIG. 4, a theory is illustrated developed from scientific evidence to explain the nature of the promoting compounds. For example, as illustrated in FIG. 4, a molecular bromine molecule forms a complex with the surface of the base sorbent comprising a high surface area form of a metal oxide. Complexing with bromine can occur at surface and defect sites on the surface of the glassy amorphous tectosilicates by association with the Lewis basic oxygen lining the interstitial cavities and the alkali actions on the surface. Molecular hydrogen bromide or an electrophilic or Lewis acid bromine compound react to form a similar structure. The precedence for this promotion of a metal oxide surface complex with an acidic species is described in a paper by Stark and Klabunde (Klabunde, K. J. Chem. Mater. 1996, 8, 1913-1918) who showed addition of acids, HCl, $SO_3$, and NO, to a MgO surface to form a surface complex. In U.S. Pat. No. 6,517,423 to Koper et al. the described surface complexes were active for destroying biological agents and toxins. As shown in FIG. 4, addition of halogens to a metal oxide surface (A) can form a complex that could be described as a bromide-oxybromide species (B), in which electrophilic reactivity is maintained, owing to the formation of positive charges on the surface. The electrophilic complex formed on the metal oxide base sorbent comprises an active site for oxidation of elemental mercury. Addition of mercury to the complex results in formation of a mercury oxygen bond and, simultaneously, a mercury bromine bond as shown in complex C in FIG. 4. Thus the final structure is a stable oxidized Hg form (D) described as a metaloxymercuric bromide.

In summary, it has now been found that the formation of the new bromide complex with the metal oxide surface increases the surface reactivity toward mercury and other pollutants. Additionally, the resulting bromide compound is uniquely suited to facilitate oxidation of the mercury. The effectiveness of the oxidation apparently results from the promotion effect of the halide, exerted on the developing positive charge on the mercury during the oxidation, known in the chemical art as a specific catalytic effect. Thus as the mercury electrons are drawn toward the positive surface oxygen, the halide anion electrons are pushing in from the other side, stabilizing the positive charge developing on the mercury and lowering the energy requirement for the oxidation process. Bromide is especially reactive, owing to the highly polarizable electrons in the outer 4p orbitals of the ion. Thus adding HBr or $Br_2$ to the appropriate metal oxide forms a similar surface bromide complex, in which the positive oxygen oxidizes the mercury with the assistance of the bromide ion.

In embodiments, a non-carbon base sorbent with Lewis basic sites/groups comprising metal-oxygen-metal structures is activated by a promoter of this disclosure, forming a promoted sorbent. The promoter and the metal-oxygen-metal structures of the non-carbon base sorbent form metastable complexes, which are responsible for mercury capture via chemisorption. For example, metastable complexes may form between a halogen promoter and inorganic species on a non-carbon base sorbent, wherein inorganic species include sodium (Na), calcium (Ca), magnesium (Mg), aluminum (Al), iron (Fe) compounds, and combinations thereof. In some embodiments, the metastable complexes comprise a dihalogen group, such as Br—Cl, Br—Br, complexed with metal-oxygen-metal structures of the base sorbent. In some embodiments, the metastable complexes comprise a halogen atom, complexed with metal-oxygen-metal structures of the base sorbent. In some embodiments, the metastable complexes comprise a hydrohalogen group, complexed with metal-oxygen-metal structures of the base sorbent. In some embodiments, the metastable complexes comprise a Group V or Group VI halide, complexed with metal-oxygen-metal structures of the base sorbent. In some embodiments, the metal-oxygen-metal structures of the base sorbent are complexed with combinations of the functional groups disclosed herein. Without wishing to be limited by a theory, it is believed that mercury capture via chemisorption takes place through the action of mercury oxidation provided by these metastable complexes.

In embodiments, a carbon base sorbent with Lewis acid sites/groups comprising graphene sheets is activated by a promoter of this disclosure, forming a promoted sorbent. The promoter and the grapheme sheets of the carbon base sorbent form stable compounds, which are responsible for mercury capture via chemisorption. Without being limited by a theory, it is believed that mercury capture via chemisorption takes place through the action of mercury oxidation provided by these stable compounds. As one skilled in the art would appreciate, the versatility of chemistry associated with the base sorbent (carbon, non-carbon, or combination thereof) and the promoter of this disclosure enables versatile applications of the promoted sorbent system for mercury capture. This is especially advantageous because mercury content in flue gases varies from facility to facility, from operation to operation, and from day to day.

Examples of non-carbon base sorbents are amorphous forms of tectosilicates that comprise nanoscale cavities lined with Lewis basic oxygen associated with Group I alkali metals and Group II alkaline-earth metals. Such tectosilicates can be found in naturally occurring minerals, including, but not limited to, perlite and pumacite. Examples of non-carbon base sorbents also include amorphous forms of phyllosilicates. It is appreciated that other minerals may be used and also treated chemically and thermally to increase the activity of the base sorbent materials, such as phyllosilicates in the amorphous forms.

In some embodiments, bentonites are used as non-carbon base sorbents, including sodium bentonite and calcium bentonite. The use of other types of bentonites is contemplated as is known to one skilled in the art. The application of bentonite base sorbents is by introducing them into the flue gas at a location of the mercury capture system wherein the temperature of that location is below 800° C.

In some embodiments, the base sorbents are treated chemically and/or thermally to increase their activity. For example, perlite as a base sorbent may go through vacuum treatment and then thermal treatment so as to reduce the moisture contained therein, increase its activity, and potentially alter its morphology. Other treatment processes include chemical treatment, such acid treatment and alkaline treatment. These treatment methods may be combined to achieve desired effects as known to one skilled in the art. One of the desired effects is to increase the number of available Lewis acid sites/groups in the carbon base sorbent and/or the number of available Lewis basic sites/groups in the non-carbon base sorbent for subsequent activation via reaction with a promoter disclosed herein.

Figure 3:
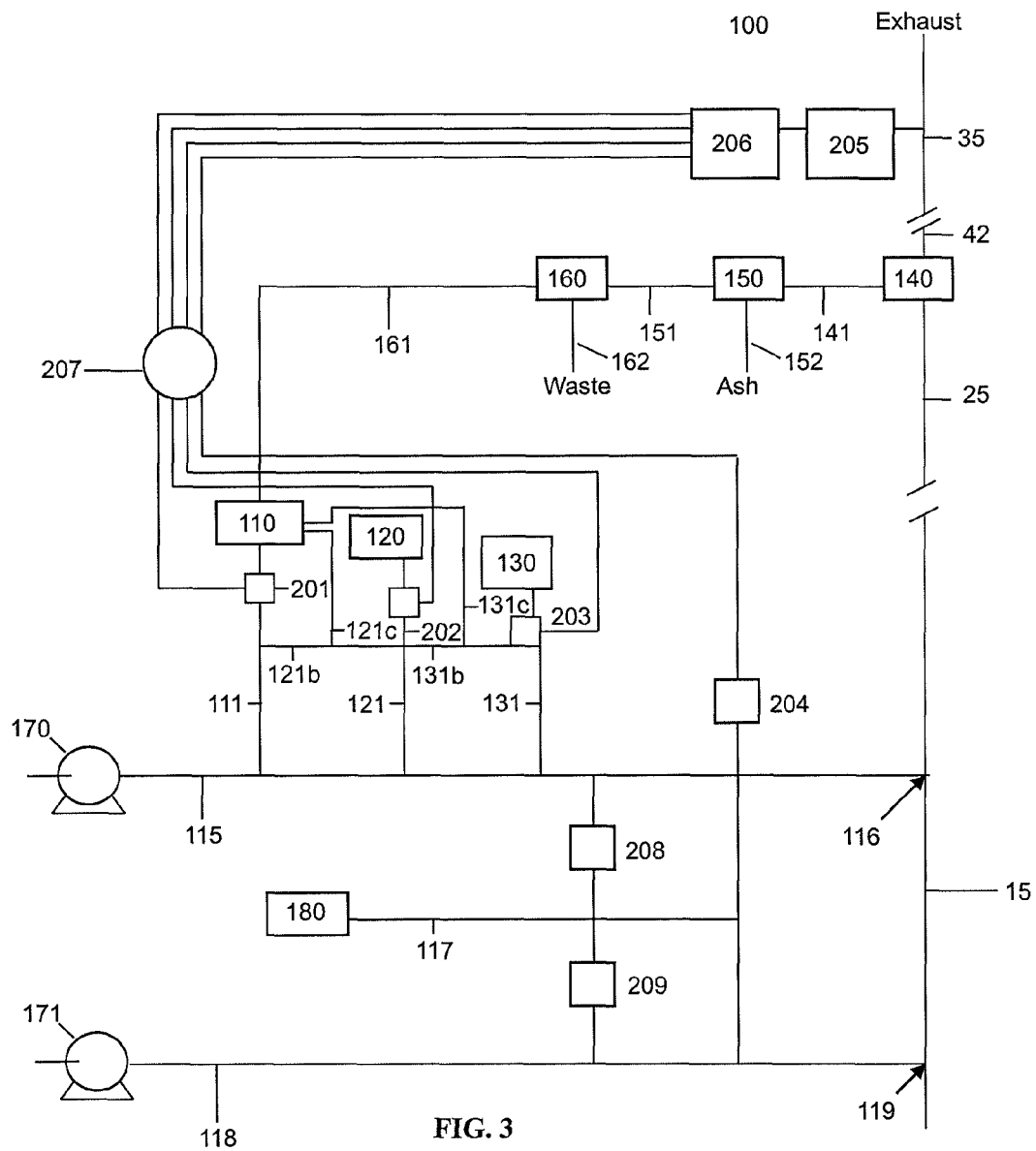
FIG. 3 schematically illustrates preparation of promoted carbon and/or non-carbon sorbents and processes for flue gas mercury reduction in flue gases and/or product gases from a gasification system in accordance with the present invention, including in-flight preparation of promoted carbon and/or non-carbon sorbent.

Referring now to FIG. 3, a schematic flow diagram is provided of mercury control system 100 comprising preparation of promoted base sorbents and flue gas mercury reduction in accordance with preferred embodiments of the present invention. In the exemplary embodiment shown, there is provided a base sorbent reservoir 110, a halogen/halide promoter reservoir 120, a secondary component reservoir 130, and an alkali component reservoir 180, each of which with corresponding flow control device(s) 201, 202, 203, and 208/209, respectively. In conjunction with the alkali component reservoir 180, flow control devices 208 and 209 can be used independently, together, or not at all. Further, reservoirs 110, 120, 130 and 180 are optional and can be used in any combination, or not at all, whereby the otherwise stored components can be introduced into the system by other means either together or independently. Further, the alkali and secondary components may not be used at all within the system, if so desired.

As shown, reservoirs 110, 120, 130, and 180 connect through their respective flow control devices and via associated piping, to transport line 115. Alkali component reservoir 180 may also connect, through respective flow control devices and via associated piping, to transport line 118. A source of air, nitrogen, or other transport gas(es) is provided by gas source 170 to transport line 115 for the purpose of entraining materials discharged from reservoirs 110, 120, 130, and 180 and injecting such materials, via injection point 116, into contaminated flue gas stream 15. A source of air, nitrogen, or other transport gas(es) may be provided by gas source 171 to transport line 118 for the purpose of entraining materials discharged from reservoirs 180 and injecting such materials, via injection point 119, into flue gas stream 15. Gas sources 170 and 171 may be the same or different, as desired. Alternatively, transport gas(es) may be provided to both transport lines 115 and 118 by gas source 170 (connection from source 170 to line 118 not shown). Although gas sources 170 and 171 are shown in FIG. 3 as compressors or blowers, any source of transport energy known in the art may be acceptable, as will be appreciated by those of skill in the art.

For clarity, single injection points 116 or 119 are shown in FIG. 3, although one skilled in the art will understand that multiple injection points and/or locations are within the scope of the present invention. In the embodiment shown, transport line 15 comprises multiple lines allowing for multiple injections and separate and/or combined injections of base sorbent 110 and promoter 120 and/or 130. One mode of operation, by example, comprises providing base sorbent 110 in a common line which is promoted inline "in-flight" using promoter 120 and/or 130 and injected at point 116. Another mode of operation, by example, comprises transport and injection of a base sorbent 110 in a separate line to a point downstream of the injection of promoter 120 and/or 130 in a line at point 116 which is upstream of injection of base sorbent 110, resulting in in-flight preparation at a promoted sorbent within stream 15.

In the exemplary embodiment shown, an optional optical density measuring device(s) 204 is connected to transport line 115 and/or 118 to provide signals representative of the optical density inside transport line 115 and/or 118 as a function of time.

Downstream from injection point 116 and 119 is provided particulate separator 140. By way of illustration and not limitation, particulate separator 140 may comprise one or more fabric filters, one or more ESPs, or other particulate removal devices as are known in the art. It should be further noted that more than one particulate separator 140 may exist, sequentially or in parallel, and that injection point 116 and 119 may be at multiple locations upstream and/or downstream of 140 when parallel, sequential, or combinations thereof exist. Particulate separator 140 produces at least a predominantly gaseous ("clean") stream 142 and a stream 141 comprising separated solid materials. A sorbent/ash separator 150 separates stream 141 into a largely ash stream 152 and a largely sorbent stream 151. Stream 151 may then preferably be passed to an optional sorbent regenerator 160, which yields a regenerated sorbent stream 161 and a waste stream 162.

An optional continuous emission monitor (hereinafter "CEM") 205 for mercury is provided in exhaust gas stream 35 to provide electrical signals representative of the mercury concentration in exhaust stream 35 as a function of time. The optional mercury CEM 205 and flow controllers 201, 202, 203, 208, and 209 are electrically connected via optional lines 207 (or wirelessly) to an optional digital computer (or controller) 206, which receives and processes signals and preferably controls the preparation and injection of promoted carbon sorbent into contaminated flue gas stream 15.

In operation, as example, promoted sorbent and/or an optional alkali component is injected into contaminated flue gas stream 15. After contacting the injected material with the contaminated flue gas stream 15, the injected material reduces the mercury concentration, transforming contaminated flue gas into reduced mercury flue gas, 25. The injected material is removed from the flue gas 25 by separator 140, disposed of or further separated by optional separator 150, and disposed of or regenerated by an optional regenerator 160, respectively. The reduced mercury clean flue gas stream 142 is then monitored for mercury content by an optional CEM 205, which provides corresponding signals to an optional computer/controller 206. Logic and optimization signals from 206 then adjust flow controllers 201, 202, 203, 208, and 209 to maintain the mercury concentration in exhaust stream 35 within desired limits, according to control algorithms well known in the art. Flow controllers 201, 202, 203, 208, and 209 can also be adjusted manually or by some other automated means to maintain the mercury concentration in exhaust stream 35 within desired limits, according to control algorithms well known in the art.

Referring still to FIG. 3, several embodiments are illustrated for preparation and injection of promoted sorbents and/or alkali components in accordance with the present invention. Stream 111 provides for introduction of base sorbent from reservoir 110, as metered by flow controller 201 manually or under the direction of computer 206. The halogen/halide may be combined and react with the base sorbent according to any of several provided methods. The halogen/halide may preferably be combined via line 121 directly into transport line 115, within which it contacts and reacts with the base sorbent prior to injection point 116 or downstream at point 116. This results in in-flight preparation of a promoted sorbent in accordance with the invention. Further, the halogen/halide may be combined via line 121b with the base sorbent prior to entering transport line 115. Still further, the halogen/halide may be contacted and react with the base sorbent by introduction via line 121c into reservoir 110. This option is preferably employed when, for example, reservoir 110 comprises an ebulliated or fluidized bed of base sorbent, through which halogen/halide flows in gaseous form or as a vapor. Of course, the halogen/halide may also preferably be contacted with the base sorbent in liquid form or in a solvent, as discussed previously, and solvent removal (not shown in FIG. 3) may then be provided if necessary as mentioned with respect to embodiments discussed with reference to FIG. 1.

Similarly, the optional secondary component may be contacted and react directly in transport line 115 via line 131, or optionally as described above with respect to the halogen/halide, via lines 131b and 131c.

Similarly, the optional alkali component from 180 may either be added in transport line 115 directly, or may be injected separately by transport line 118, combining downstream in flue gas 15 for synergistic effects with the base sorbent, promoted sorbent, or optional secondary components. Being able to vary on-site the amount of the optional alkali component relative to base sorbent, promoted sorbent, or optional secondary components is a key feature to overcome and optimize for site-specific operating and flue gas conditions.

In some preferred embodiments wherein contacting between components and reaction is performed in a liquid or solvent phase, stirring of such liquid and/or slurry mixtures may be provided. In other embodiments, the halogen/halide promoter and optional secondary component(s) may preferably be sprayed in solution form into or on the base sorbent. In some such embodiments, drying, filtering, centrifugation, settling, decantation, or other solvent removal methods as are known in the art may then be provided.

In embodiments wherein the halogen/halide promoter is in gaseous or vapor form, it may be diluted in air, nitrogen, or other gas as appropriate. The halide/halogen gas, for example, gaseous HBr or $Br_2$, may be passed through an ebulliated or fluidized bed of granular or fibrous base sorbent, with the promoted sorbent so produced removed from the top of the bed via gas entrainment for injection.

In some embodiments, the secondary component(s) may preferably comprise iodine or other halogens, hydrohalides, including without limitation HI, HBr, HCl, a Group V or Group VI element with a molecular halogen, such as $SCl_2$ and others. In some preferred embodiments, the promoted sorbent may comprise from about 1 to about 30 g of halogen/halide per 100 g of base sorbent. In some preferred embodiments, the promoted sorbent may comprise a secondary component in concentration of from about 1 to about 15 wt % of the concentration of the halogen/halide component.

In still other embodiments, the product-promoted sorbent may be applied to a substrate. In other embodiments, such prepared substrate(s) may be caused to contact a contaminated flue gas or gasification system product gas stream for mercury reduction purposes. Such substrates may be monolithic, rotating, or exposed to the gas stream in any number of ways known to those skilled in the art.

In some embodiments, a method is provided whereby a mercury stabilizing reagent is added to a promoted sorbent to produce a bifunctional sorbent. Such stabilizing reagent(s) may be sequentially added, either before or after the addition and reaction of the halogen/halide. In some preferred embodiments, the halogen/halide preferably comprises Br or HBr, and the mercury-stabilizing reagent may comprise S, Se, $H_2S$, $SO_2$, $H_2Se$, $SeO_2$, $CS_2$, $P_2S_5$, and combinations thereof.

Halogens in Mercury Capture

Methodologies for using halogens for the treatment of flue gas have been problematic, owing to their reactivity with other gases and metals, resulting in corrosion and health issues. A "halogen" is defined as a member of the very active elements comprising Group VIIA (CAS nomenclature is used throughout; Group VIIA (CAS) corresponds to Group VIIB (IUPAC)) of the periodic table. In the molecular elemental form of the halogens, including $F_2$, $Cl_2$, $Br_2$, and $I_2$, the reaction with hot flue gas components leaves little to react with elemental mercury. The atomic elemental halogen form, which includes the fluorine, chlorine, bromine, and iodine atoms, is about a million times more reactive to mercury, but the concentration of the atomic forms is typically extremely low. In a large portion of electric utility coal combustion facilities, the concentrations are generally not sufficient to oxidize a significant amount of mercury.

The term "halide" as used herein is defined as a compound formed from the reaction of a halogen with another element or radical. In general, halide compounds are much less reactive than the molecular halogens, having a low chemical potential. Halides are considered reduced forms that do not, alone, oxidize other compounds. In the conventional view, therefore, a halide salt-treated sorbent will not effectively oxidize elemental mercury and capture elemental mercury.

Halogen-Promoted Sorbent Characteristics

The promoted sorbent described here has a very high initial reactivity for oxidizing mercury and therefore, can be used in very small amounts to achieve very high capture efficiencies, thus lowering operation costs and lessening waste disposal problems. In addition, further disposal reductions are obtainable by regenerating and reusing the promoted sorbents produced using the inventive technology. The time interval required for the mercury and the promoted sorbents of the present invention to successfully interact in a flue gas duct, with subsequent collection of the mercury on the promoted sorbent and ash, is very short—less than seconds. Clearly, such collection times require the promoted sorbent to have both high capacity and high reactivity toward mercury. The promoted sorbent can be utilized in a very finely powdered form to minimize mass-transfer limitations. However, again, the reactivity should be very high to capture all of the mercury encountered by the fine particles. Additionally, use of these enhancement technologies allows capture to be effective for larger sorbent particles which also allows separation of the promoted sorbent from the ash to enable subsequent regeneration as well as ash utilization. One feature of this invention is the process to prepare a promoted sorbent containing a halide component formed on and/or within the base sorbent structure that provides a sorbent that is highly active on initial contact with the mercury-contaminated gas stream, which allows for very effective capture of the mercury.

Figure 2:
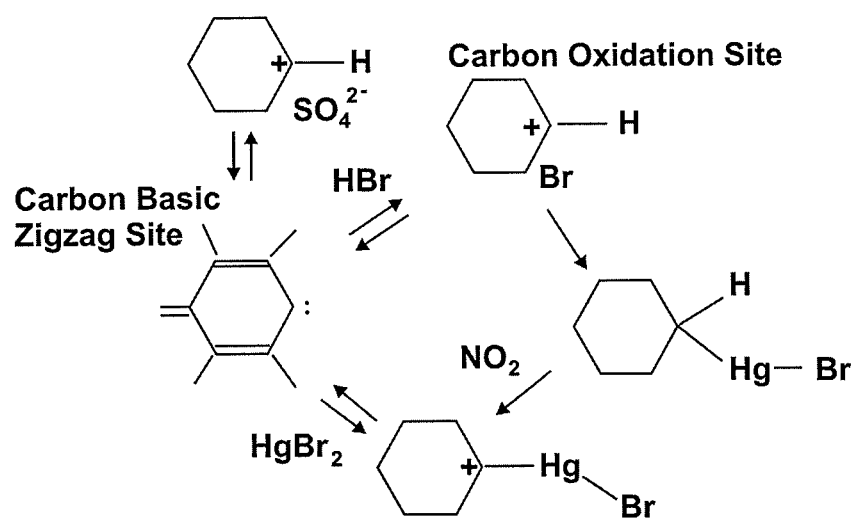
FIG. 2 illustrates a proposed mechanistic model of the chemical reactions resulting in the oxidation and capture of mercury.

The inventive sorbents chemically combine bromine species with Lewis acid/basic sites on the base sorbent. For example, x-ray photoelectron spectroscopy has established that the addition of bromine, chlorine, HBr, or HCl formed a chemical compound in the carbon structure. Thus the promoted sorbent produced from halogen and base sorbent does not represent a molecular halogen form, but rather a new chemically modified structure. This phenomenon may not occur with the less reactive iodine, where an $I_2$ molecular complex can exist on the carbon basal plane. In the case of bromine, modified cationic carbon has a high chemical potential for oxidation of mercury. Thus an entirely new model is presented for the reactivity of the bromine-treated carbon with mercury shown in FIG. 2. The reactive carbon form can preferably be generated by the addition of bromine, hydrogen bromide, or combinations of bromine and other elements, as described herein. Halogen treatment resulted in higher-activity carbons because the halide anions (especially bromide and iodide) were effective in promoting oxidation by stabilizing the developing positive charge on the mercury in the transition state for oxidation. Based on this model, several innovative, inexpensive, activity-enhancing features have been developed.

Optional Second Component

It has been demonstrated that addition of an optional second component, in addition to the bromine, results in improved reactivity and capacity for the promoted sorbent, typically exceeding that of both the untreated base sorbent and the brominated carbon. The second compound comprises either a second halogen or a compound derived from a second halogen, such as HI. Thus in addition to having a reactive carbon form present, the second component generates a Lewis base with greater ability to stabilize the developing positive charge on the mercury. Thus the second component is an element with more polarized electrons (4p and 5p).

Optional Alkali Component

It has been demonstrated that addition of an optional alkali component with a base or promoted activated carbon results in improved mercury capture, typically exceeding that of both the untreated carbon and the promoted carbon. Test data indicate that flue gas contaminants, flue gas constituents ($SO_2$, $NO_x$, HCl, etc), operating temperature, mercury form, and mercury concentration may impact the effectiveness of the alkali addition. This suggests the need to be able to adjust and tailor the alkali-to-activated-carbon ratio on-site in order to overcome and optimize for a given set of site conditions.

The synergy that can be gained when coinjecting the two materials can be explained as follows. First, testing shows that binding sites on activated carbon (hereinafter "AC") can be consumed by chlorine species, sulfur species (i.e., sulfates), and other flue gas contaminants (arsenates, selenates, etc). The addition of optional alkali material will interact and react with these species/contaminants, thus minimizing their consumption of AC mercury binding sites. Second, testing also shows that standard AC will continue to oxidize mercury, even though the binding sites are fully consumed. This oxidized mercury can then react with alkali material and subsequently be captured by particulate control devices. Consequently, the addition of the optional alkali component acts to protect mercury-binding sites and capture oxidized mercury, thereby resulting in improved mercury reduction at lower cost. Alkali is generally much lower in cost (~ an order of magnitude less) than AC; thus more of it can be used, still resulting in overall lower costs.

In-Flight Sorbent Preparation

As stated previously, the halogen promoted sorbent can be readily produced in-flight. This is accomplished by, for example, contacting the vapors of any combination of halogens and, optionally, a second component, in-flight, with base sorbent particles. The particles may be dispersed in a stream of transport air (or other gas, such as the flue gas itself), which also conveys the halogen/halide-promoted sorbent particles to the flue gas duct, or other contaminated gas stream, from which mercury is to then be removed. There is no particular temperature requirement for this contact. This technology is obviously very simple to implement, and results in a great cost savings to facilities using this technology for mercury capture.

Figure 5A:
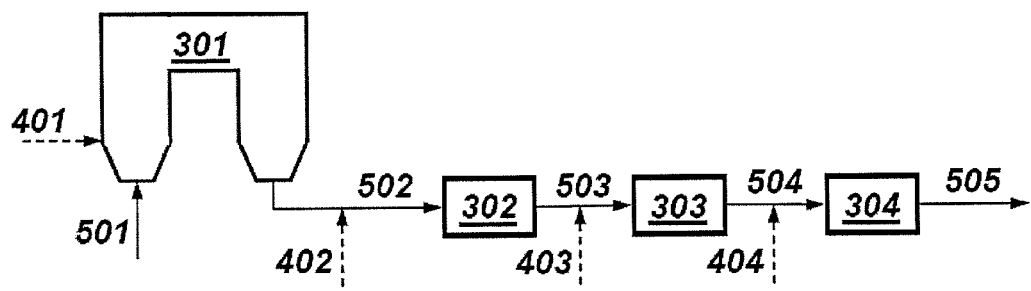
FIG. 5A schematically illustrates an exemplary process flow diagram for in-flight preparation of a promoted carbon and/or non-carbon sorbent.
Figure 5B:
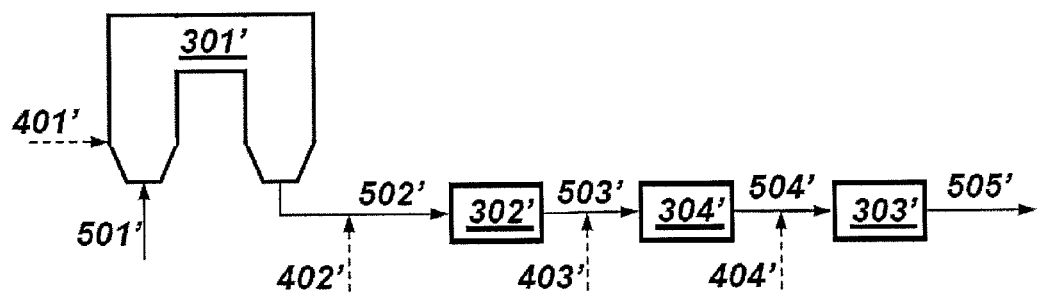
FIG. 5B schematically illustrates an exemplary process flow diagram for in-flight preparation of a promoted carbon and/or non-carbon sorbent.

Referring to FIGS. 5A and 5B, process flow diagrams are shown as examples of the process for mercury removal from a mercury containing gas, such as a flue gas. In an embodiment shown at FIG. 5A, gas inlet stream 501 passes through chamber 301 and enters air heater 302 as stream 502; then it exits air heater 302 as stream 503 and passes through particulate control device 303 and enters scrubber 304 as stream 504; finally it exits scrubber 304 as stream 505. As shown, chamber 301 is a boiler, however, one skilled in the art will appreciate that chamber 301 can also be the combustion chamber of a coal fired boiler, a stand alone combustion chamber or any other chamber in which mercury containing gas is either generated or passed through. Injection streams 401, 402, 403 and 404, in addition to stream 501, are multiple locations wherein promoter, base sorbent, or a combination of promoter and base sorbent may be introduced.

FIG. 5B shows an embodiment similar to that of FIG. A, but with the position of the scrubber and particulate control device switched. Specifically, gas inlet stream 501' passes through chamber 301' and enters air heater 302' as stream 502'; then it exits air heater 302' as stream 503' and passes through scrubber 304' and enters particulate control device 303' as stream 504'; finally it exits particulate control device 303' as stream 505'. As shown, chamber 301 is a boiler, however, one skilled in the art will appreciate that chamber 301 can also be the combustion chamber of a coal fired boiler, a stand alone combustion chamber or any other chamber in which mercury containing gas is either generated or passed through. Injection stream locations 401', 402', 403' and 404', in addition to stream 501', represent multiple locations wherein promoter, base sorbent, or a combination of promoter and base sorbent may be introduced.

At each of the aforementioned injection stream locations 401, 401', 402, 402', 403, 403', 404 and 404', 501, 501' multiple injection points are contemplated so that promoter and base sorbent may be injected as a single injection stream or as separate injection streams, as further illustrated in the following exemplary embodiments.

In an embodiment, a promoter is introduced to chamber 301 at location 401. A base sorbent (carbon, non-carbon, or their combination) is introduced at location 402 upstream of air heater 302. In a further embodiment, a promoter is introduced to at location 402 upstream of air heater 302. A base sorbent (carbon, non-carbon, or their combination) is also introduced at location 402 either as a separate stream or as a mixed single stream with the promoter. In another embodiment, a promoter is introduced at locations 401 and 402. A base sorbent (carbon, non-carbon, or their combination) is introduced at location 402 either as a separate stream or as a mixed single stream with the promoter.

With the aid of this disclosure, one of ordinary skill in the art will be able to configure the process in many different fashions for mercury removal using the promoted sorbent. All these configurations are considered equivalents of the disclosed process and therefore are within the scope of the claimed invention.

Advantages of On-Site Preparation

In-flight preparation of the halogen/halide-promoted sorbent on location produces certain advantages. For example, the treatment system can be combined with the base sorbent injection system at the end-use site. With this technique, the halogen/halide is introduced to the base sorbent air (or other gas, including to the flue gas or other mercury containing gas) mixture in a transport line (or flue gas duct part of the base sorbent storage and injection system). This provides the following benefits over current conventional concepts for treating sorbents off-site:

Capital equipment costs at a treatment facility are eliminated.

Costs to operate the treatment facility are eliminated.

There are no costs for transporting carbon and additive to a treatment facility.

The inventive process uses existing hardware and operation procedures.

The inventive technology ensures that the sorbent is always fresh and, thus, more reactive.

No new handling concerns are introduced.

There are no costs for removing carbon from treatment system.

The inventive process allows rapid on-site tailoring of additive-sorbent ratios in order to match the requirements of flue gas changes, such as may be needed when fuels are changed or loads are reduced, thus further optimizing the economics.

The inventive technology reduces the amount of spent sorbents that are disposed.

With the foregoing and other features in view, there is provided, in accordance with the present invention, embodiments including a process for preparing and regenerating halogen/halide-promoted sorbents, whose activity for mercury capture is enhanced by the addition of halogen (e.g., bromine) to the base sorbent structure.

Sorbent Injection Location

Some of the preferred embodiments contemplate the use of a halogen-promoted sorbent in a powdered form that has been injected into a flue gas stream before or after ash particulates have been removed. Other embodiments of the inventive composition of the halogen-promoted sorbent comprise a powdered modified AC prepared by adding $Br_2$ or HBr plus a second optional component. Other embodiments allow the addition of the optional alkali component in conjunction with a base AC and/or with the use of a halogen-based sorbent and any other combinations of the sorbent technologies provided in this patent. Other embodiments allow for in-flight preparation of promoted sorbents by using and combining the promoters and base sorbents. Alternatively, embodiments include methods wherein the base sorbent is on a moving contactor consisting of particles or fibers containing one or more of the compositions listed above.

Sorbent Regeneration

Any of the above embodiments of the halogen/halide-promoted carbon and/or non-carbon sorbent can be easily regenerated; the poisoning contaminants from the flue gas are preferably removed, and an inexpensive promoting agent added, to restore mercury sorption activity. This process of promoting the activity of the carbon and/or non-carbon itself contrasts with the earlier, more expensive, conventional methods of adding a reagent (such as peroxide, gold, triiodide, etc.) to a base sorbent. The halogen/halide-promoted carbon sorbent of the present invention, treated with bromine and/or optional components, is noncorrosive. Detailed examples of sorbent regeneration techniques are described in copending, commonly owned PCT Patent Application No. PCT/US04/12828, titled "PROCESS FOR REGENERATING A SPENT SORBENT," which is hereby incorporated by reference in its entirety.

Sorbent Injection Control Schemes

Another advantage of the present invention relates to the use of a feedback system to more efficiently utilize certain aspects of the invention. Where possible and desirable, the mercury control technology of the present invention may preferably utilize continuous measurement of mercury emissions as feedback to assist in control of the sorbent injection rate. Tighter control on the sorbent and optional component(s) levels can be achieved in this way, which will ensure mercury removal requirements are met with minimal material requirements, thus minimizing the associated costs. In an embodiment, the mercury emissions are continuously measured downstream of the injection location, preferably in the exhaust gas at the stack.

EXAMPLES

To more clearly illustrate the present invention, an example is presented below. This example is intended to be illustrative, and no limitations to the present invention should be drawn or inferred from the example presented herein.

Example 1

Non-Carbon-Promoted Sorbent Tests at Full-Scale Plants

Full-scale commercial tests were conducted at several coal-burning facilities equipped with ESPs wherein three types of pre-cursers were injected upstream of an ESP at 325° F. In all, more than thirty tests were performed with variations in base sorbent material, base sorbent material injection rates and promoter injection rates. Promoters were halogen-based materials. Base sorbents were clay-based materials such as perlite and pumacite, which are vesicular forms of tectosilicates comprising silicates and aluminate tetrahedra with alkali metals in the interstitual spaces. Each base sorbent was injected upstream from the ESP.

The flue gas flow rate for the test was approximately 23 million $dsft^3$/hr with a corresponding mercury flow rate of 0.0097 lbs Hg/hr. Initial mercury concentration in the flue gas prior to the introduction of the base sorbent or promoted sorbent was approximately 0.000417 lbs Hg/million $dsft^3$.

As shown in Table 1, each base sorbent was injected at three different test rates: about 100 lb/hr ("Low"), about 150 lb/hr ("Ave.") and about 200 lb/hr ("High"). At each test rate, the mercury removal rate was measured both with and without the use of a promoter to show the relative benefit of introducing the promoter into the flue gas stream. For the tests where promoter was injected into the flue gas stream, promoter was injected at about 20 lb/hr for the "Low" tests, at about 25 lb/hr for the "Ave." tests and from about 30 to about 50 lb/hr for the "High" tests. The percent mercury removal for each test was calculated based on measurements taken from the inlet flue gas and the outlet flue gas. The results as shown in Table 1 clearly show a significant improvement in mercury capture when a promoter and base sorbent are injected, as compared to the injection of a base sorbent alone.

TABLE 1

| Base Sorbent | Test Data for Non Carbon-Promoted Sorbents | | | | | | | | |
|---|---|---|---|---|---|---|---|---|---|
| | Base Sorbent Injection Rate (lb/hr) | | | Promoter Injection Rate (lb/hr) | | | Percent Removal of Mercury (%) | | |
| Material | Low | Ave. | High | Low | Ave. | High | Low | Ave. | High |
| Perlite | 100 | 150 | 200 | 0 | 0 | 0 | 37 | 40 | 43 |
| | 100 | 150 | 200 | 20 | 25 | 35 | 55 | 72 | 74 |
| Pumacite | 100 | 150 | 200 | 0 | 0 | 0 | 25 | 25 | 25 |

TABLE 1-continued

Test Data for Non Carbon-Promoted Sorbents

| Base Sorbent Material | Base Sorbent Injection Rate (lb/hr) | | | Promoter Injection Rate (lb/hr) | | | Percent Removal of Mercury (%) | | |
|---|---|---|---|---|---|---|---|---|---|
| | Low | Ave. | High | Low | Ave. | High | Low | Ave. | High |
| | 100 | 150 | 200 | 20 | 25 | 50 | 52 | 60 | 65 |
| Clay- Based Mix of Silica and Alumina | 100 | 150 | 200 | 0 | 0 | 0 | 50 | 52 | 54 |
| | 100 | 150 | 200 | 20 | 25 | 30 | 58 | 65 | 74 |

While the preferred embodiments of the invention have been shown and described, modifications thereof can be made by one skilled in the art without departing from the spirit and teachings of the invention. The embodiments described herein are exemplary only and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The examples provided in the disclosure are presented for illustration and explanation purposes only and are not intended to limit the claims or embodiment of this invention. While the preferred embodiments of the invention have been shown and described, modifications thereof can be made by one skilled in the art without departing from the spirit and teachings of the invention. Process criteria, equipment, and the like for any given implementation of the invention will be readily ascertainable to one of skill in the art based upon the disclosure herein. The embodiments described herein are exemplary only and are not intended to be limiting. Many variations and modifications of the invention disclosed herein are possible and are within the scope of the invention. Use of the term "optionally" with respect to any element of the invention is intended to mean that the subject element is required, or alternatively, is not required. Both alternatives are intended to be within the scope of the invention.

The discussion of a reference in the Background is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

Although the invention is described herein as a promoted sorbent material and associated processes for its preparation and use, it is nevertheless not intended to be limited to the details described, since various modifications and structural changes may be made therein without departing from the spirit of the invention and within the scope and range of equivalents of the claims.

What is claimed is:

1. A method for separating mercury from a mercury containing gas comprising:
    (a) providing a carbon sorbent material and a non-carbon sorbent material, wherein the carbon sorbent material comprises activated carbon;
    (b) providing a halogen or halide promoter;
    (c) promoting at least a portion of the carbon sorbent material and the non-carbon sorbent material by chemically reacting the carbon sorbent material and the non-carbon sorbent material with the halogen or halide promoter to form a promoted halogenated carbon sorbent and a promoted halogenated non-carbon sorbent;
    (d) chemically reacting elemental mercury in the mercury containing gas with the promoted halogenated carbon sorbent and the promoted halogenated non-carbon sorbent to form a mercury/sorbent chemical composition; and
    (e) separating particulates from the mercury containing gas to form a cleaned gas, the particulates including ash and the mercury/sorbent chemical composition.

2. The method of claim 1, further comprising the step of injecting the non-carbon sorbent material and the halogen or halide promoter into the mercury containing gas.

3. The method of claim 2, wherein said halogen or halide promoter and the non-carbon sorbent material are injected into the mercury containing gas at the same location.

4. The method of claim 2, wherein said halogen or halide promoter and the non-carbon sorbent material are injected into the mercury containing gas at separate locations.

5. The method of claim 4, wherein said halogen or halide promoter is injected into the mercury-containing gas upstream of the injection of said non-carbon sorbent material.

6. The method of claim 5, wherein said halogen or halide promoter is injected into a combustion chamber that produces a mercury-containing gas, and the non-carbon sorbent material is injected downstream of the combustion chamber.

7. The method of claim 6, wherein said halogen or halide promoter is additionally injected downstream of the combustion chamber.

8. The method of claim 6, wherein said combustion chamber is a boiler and the mercury-containing gas is a flue gas.

9. The method of claim 3, wherein said halogen or halide promoter and non-carbon sorbent material are injected downstream of a chamber that produces a mercury-containing gas.

10. The method of claim 9, wherein said chamber is a boiler and the mercury-containing gas is a flue gas.

11. The method of claim 2, wherein the rate at which said non-carbon sorbent material is injected or the rate at which said promoter is injected or combination thereof is adjusted according to a monitored mercury content in the cleaned gas so that the mercury content of the cleaned gas is maintained at substantially a desired level.

12. The method of claim 1, wherein said non-carbon sorbent material is selected from the group consisting porous felsic materials, vesicular felsic materials, porous basaltic materials, vesicular basaltic materials, clay-based compounds, alkaline compounds, calcium hydroxide compounds, sodium acetate compounds, bicarbonate compounds, and combinations thereof.

13. The method of claim 12, wherein said non-carbon sorbent material is a material that reacts with oxidized mercury in the mercury-containing gas to form a second mercury/sorbent chemical composition.

14. The method of claim 1, wherein said non-carbon sorbent material comprises Lewis basic groups.

15. The method of claim 12, wherein said non-carbon sorbent material comprises amorphous forms of tectosilicates comprising nanoscale cavities lined with Lewis basic oxygen associated with alkaline-earth metals.

16. The method of claim 15, wherein said alkaline-earth metals comprise Group I and Group II alkaline-earth metals.

17. The method of claim 1 wherein said non-carbon sorbent material comprises amorphous forms of phyllosilicates comprising nanoscale cavities lined with Lewis basic oxygen.

18. The method of claim 1, wherein said promoted non-carbon sorbent comprises metastable complexes formed between said promoter and inorganic species on the non-carbon sorbent.

19. The method of claim 18 wherein said inorganic species is selected from the group consisting of sodium compounds, calcium compounds, magnesium compounds, aluminum compounds, iron compounds, and combinations thereof.

20. The method of claim 1, wherein said promoted non-carbon sorbent comprises metastable complexes formed between said promoter and metal-oxygen-metal structures on the non-carbon sorbent.

21. The method of claim 20, wherein said promoter after being complexed with the metal-oxygen-metal structures is in the form selected from the group consisting of a dihalogen group, a halogen atom, a hydrohalogen group, a Group V halide, a Group VI halide, and combinations thereof.

22. The method of claim 1, wherein said promoted non-carbon sorbent comprises activated Lewis basic groups or activated Lewis acid groups or combination thereof.

23. The method of claim 1, wherein said interaction between promoted non-carbon sorbent and said mercury-containing gas stream comprises: mercury diffusing from the gas phase onto a surface of said non-carbon promoted sorbent; and reacting with activated Lewis basic groups or activated Lewis acid groups or combination thereof to cause chemisorption on a sorbent surface.

24. The method of claim 1 further comprising pretreating said non-carbon sorbent to increase the number of Lewis basic groups or Lewis acid groups or combination thereof on said sorbent.

25. The method of claim 24, wherein pretreating said non-carbon sorbent comprises chemical treatment, thermal treatment, vacuum treatment, and combinations thereof.

26. The method of claim 25, wherein said chemical treatment comprises acid treatment and alkaline treatment.

27. The method of claim 1 further comprising introducing an alkali component into the mercury-containing gas.

28. The method of claim 1, wherein said carbon sorbent or said promoter or combination thereof are introduced into the mercury-containing gas at one or more locations.

29. The method of claim 28, wherein the rate at which said carbon sorbent is introduced or the rate at which said promoter is introduced or combination thereof is adjusted according to a monitored mercury content in the cleaned gas so that the mercury content of the cleaned gas is maintained at substantially a desired level.

30. The method of claim 1, where the promoted halogenated carbon sorbent and the promoted halogenated non-carbon sorbent comprise about 1 to about 30 grams of the halogen or halide promoter per 100 grams of the carbon sorbent and the non-carbon sorbent.

* * * * *